(12) United States Patent
Menard

(10) Patent No.: US 6,416,187 B1
(45) Date of Patent: Jul. 9, 2002

(54) MECHANICAL CONVERGENCE FIXTURE APPARATUS AND METHOD

(75) Inventor: Jean Pierre Menard, San Jose, CA (US)

(73) Assignee: Aurora Systems, Inc., San Jose, CA (US)

( * ) Notice: Subject to any disclaimer, the term of this patent is extended or adjusted under 35 U.S.C. 154(b) by 0 days.

(21) Appl. No.: 09/643,131

(22) Filed: Aug. 21, 2000

Related U.S. Application Data

(63) Continuation of application No. 09/047,292, filed on Mar. 24, 1998, now Pat. No. 6,106,120.

(51) Int. Cl.[7] .............................................. G03B 21/14
(52) U.S. Cl. ........................ 353/122; 353/119; 353/31
(58) Field of Search ........................ 353/81, 100, 101, 353/121, 122, 119; 349/57.58, 60

(56) References Cited

U.S. PATENT DOCUMENTS

| | | | | |
|---|---|---|---|---|
| 5,092,671 A | * | 3/1992 | Van Os | 353/31 |
| 5,329,391 A | * | 7/1994 | Miyamoto et al. | 359/83 |
| 5,455,678 A | * | 10/1995 | Loucks | 356/400 |
| 5,624,174 A | * | 4/1997 | Loucks | 353/122 |
| 5,754,260 A | * | 5/1998 | Ooi et al. | 349/10 |
| 5,868,485 A | * | 2/1999 | Fujimori et al. | 353/119 |

* cited by examiner

Primary Examiner—William Dowling
(74) Attorney, Agent, or Firm—Henneman & Saunders; Larry E. Henneman, Jr.

(57) ABSTRACT

A mechanical convergence fixture apparatus (10) having an LCD frame assembly (12) which is positioned in relation to a projector chassis (14) using an alignment assembly (12) which is positioned in relation to a projector chassis (14) using an alignment assembly (16). The LCD frame assembly (12) has a micro LCD (24) rigidly affixed thereto and a field lens (32) adjustably affixed thereto. A vacuum chuck (40) holds the LCD frame assembly (12) on the alignment assembly (16) while the LCD frame assembly (12) is positioned. A drop of adhesive (62) is then placed on each of a plurality of locating studs (18) and a like plurality of locating holes (20) to affix the LCD frame assembly (12) in position on the chassis (14). The alignment assembly (16) is then detached from the LCD frame assembly (12) to be reused.

10 Claims, 3 Drawing Sheets

MECHANICAL CONVERGENCE FIXTURE APPARATUS AND METHOD

RELATED APPLICATIONS

This application is a continuation of U.S. patent application Ser. No. 09/047,292, filed Mar. 24, 1998 by the same inventor, now issued as U.S. Pat. No. 6,106,120, which is incorporated herein by reference in its entirety.

TECHNICAL FIELD

The present invention relates to the field of mechanical focusing and convergence devices for optical systems, and more particularly to an improved mechanical convergence fixture for projection-type liquid crystal projectors. The predominant current usage of the inventive mechanical convergence fixture is in commercial video projection devices wherein accuracy of adjustment, economy of manufacture and ruggedness are all important factors.

BACKGROUND ART

In a liquid crystal projector, white source light is separated into beams of its three primary colors. Each beam is then infused with an image by a liquid crystal light valve or micro-LCD. Finally, the three beams are recombined into a single image and projected onto a display device (a screen).

The micro LCD's generate a representation of the image to be projected by using many small picture elements or pixels. Therefore, the above mentioned beams of light that emerge from the micro-LCD's are pixellated representations of the particular color components of the image. Thus, an accurate projected image requires that the pixels of the three infused beams be precisely aligned during the recombination step, meaning that the micro-LCD's themselves must be carefully positioned. In order to optimally orient the micro-LCD's the following requirements must be met.

(1) 6 degree of freedom (dof) adjustment capability must be available. Both rotation and linear translation with respect to three perpendicular axes are required in order to ensure that proper image alignment can be caused to occur.

(2) Adjustment mechanisms must have high resolution controls. Because of the small size of the pixels, direct manual adjustments are too crude to achieve proper alignment. Some sort of interface must be provided which can transform relatively large-scale operator inputs into micro-LCD motions of a magnitude commensurate with the pixel size.

(3) Adjustment mechanisms must provide positive positioning constraints. Since multiple operations are required to tune all 6 degrees of freedom, intermediate adjustments must have some amount of resistance to motion. Positioning devices typically have some sort of final locking mechanism, but to activate and deactivate that mechanism numerous times over the course of adjustment is cumbersome and often impossible. Therefore, any robust positioning device must provide for physical locating effects, rather than relying on balance, gravity or friction.

(4) The individual magnification of each image must be independently adjustable. There must be a means for making slight adjustments to the projected size of the image from any projection device. This means must be simple, inexpensive, and easy to use such that adjustments can be made quickly during the production process.

Conventional positioning systems have either provided limited adjustment capability or else have use complicated mechanisms. For example, in U.S. Pat. No. 5,418,586 issued to Fujimori, a light valve positioning system is disclosed which uses a combination of plates, posts, and screws to provide the full 6 degree of freedom adjustment capability. However, while the mechanism taught by Fujimori provides a significant improvement in the field, it utilizes 6 major components and 14 adjustment screws. In addition, in spite of Fujimori's own listing of problems associated with eccentric pins (manufacturing difficulty, increased part count due to supporting components, non-linear relationship between rotational input and linear translation output, and the like), the mechanism of Fujimori still includes three such pins. Also, the mechanism of Fujimori utilizes a number of direct manual adjustments, making precise control difficult. For instance, a typical adjustment procedure used according to the Fujimori teachings is represented in the rotating of the liquid crystal valve about a vertical axis. This procedure involves rotation a flat head screwdriver in a slot formed by a notch in a light fixing plate and a hole in a lower adjustment plate. In this operation, the scales of the operator inputs are completely out of scale compared to the required adjustments, making proper alignment impossible. In addition, because the adjustment actuator (the flat head screwdriver) is removed once the desired rotation is achieved, the position of the light fixing plate is not positively secured. This allows motion to occur during the actual fixing process when the fixing screws are tightened, potentially causing misalignment of the liquid crystal light valve.

Many of these concerns have been addressed in a copending patent application Ser. No. 08/970,957 entitled MECHANICAL CONVERGENCE DEVICE FOR MICRO-LCD, which has an inventor in common with this present invention. The MECHANICAL CONVERGENCE DEVICE FOR MICRO-LCD provides all of the requirements discussed above and avoids the pitfalls. Indeed, for some applications the MECHANICAL CONVERGENCE DEVICE FOR MICRO-LCD may be superior to the present invention. However, the MECHANICAL CONVERGENCE DEVICE FOR MICRO-LCD is still quite complicated and is relatively expensive to manufacture.

It would be advantageous to have a device for positioning a micro LCD in a projection device so as to provide for optimal accuracy of adjustment and ruggedness, while maintaining optimal simplicity and economy. However, to the inventor's knowledge, no prior art method or means has achieved this combination of goals. Such devices have all been either to complicated and expensive and/or too difficult to adjust, or else have been overly delicate and/or expensive to produce.

DISCLOSURE OF INVENTION

Accordingly, it is an object of the present invention to provide an optical-mechanical convergence device which will provide for accurate and easy positioning of a liquid crystal display ("LCD") in a projection apparatus.

It is still another object of the present invention to provide a method and apparatus for positioning a micro-LCD which is economical to manufacture.

It is yet another object of the present invention to provide a method and apparatus for positioning a micro-LCD which is rugged in that the position of the micro-LCD will not shift when subjected to normal shock and vibration.

It is still another object of the present invention to provide an apparatus and method for adjusting the magnification of each device channel in an LCD projector in order to make all projected images the same size.

Briefly, the preferred embodiment of the present invention is a frame for securing a micro-LCD to an associated field lens. The frame is positioned in relation to a chassis using an external three axis linear stage (alignment assembly) and, when in position, is affixed with an adhesive to a plurality of locating studs which are rigidly affixed to the chassis. The expensive alignment assembly is the removed. The alignment assembly is then an assembly device rather than a component of the shipped product, thereby greatly reducing the cost of the shipped product.

An advantage of the present invention is that, since size and expense of the adjustment mechanism are not critical (since the adjustment mechanism stays behind to be reused), then the adjustment mechanism can be made to be very accurate and easy to use.

A further advantage of the present invention is that the micro-LCD can be very accurately positioned and held in place.

Yet another advantage of the present invention is that the micro-LCD is rigidly affixed on a very light frame which is not readily susceptible to shock and vibration.

Still another advantage of the present invention is that the per unit expense is greatly reduced.

Yet another advantage of the present invention is that an optical element (a field lens) can be re-positioned axially to provide slight adjustments of the magnification of the individual image devices, thereby allowing very high resolution alignment.

These and other objects and advantages of the present invention will become clear to those skilled in the art in view of the description of the described mode of carrying out the invention and the industrial applicability of the preferred embodiment as described herein and as illustrated in the several figures of the drawing.

DETAILED DESCRIPTION OF THE INVENTION

Figure 1:
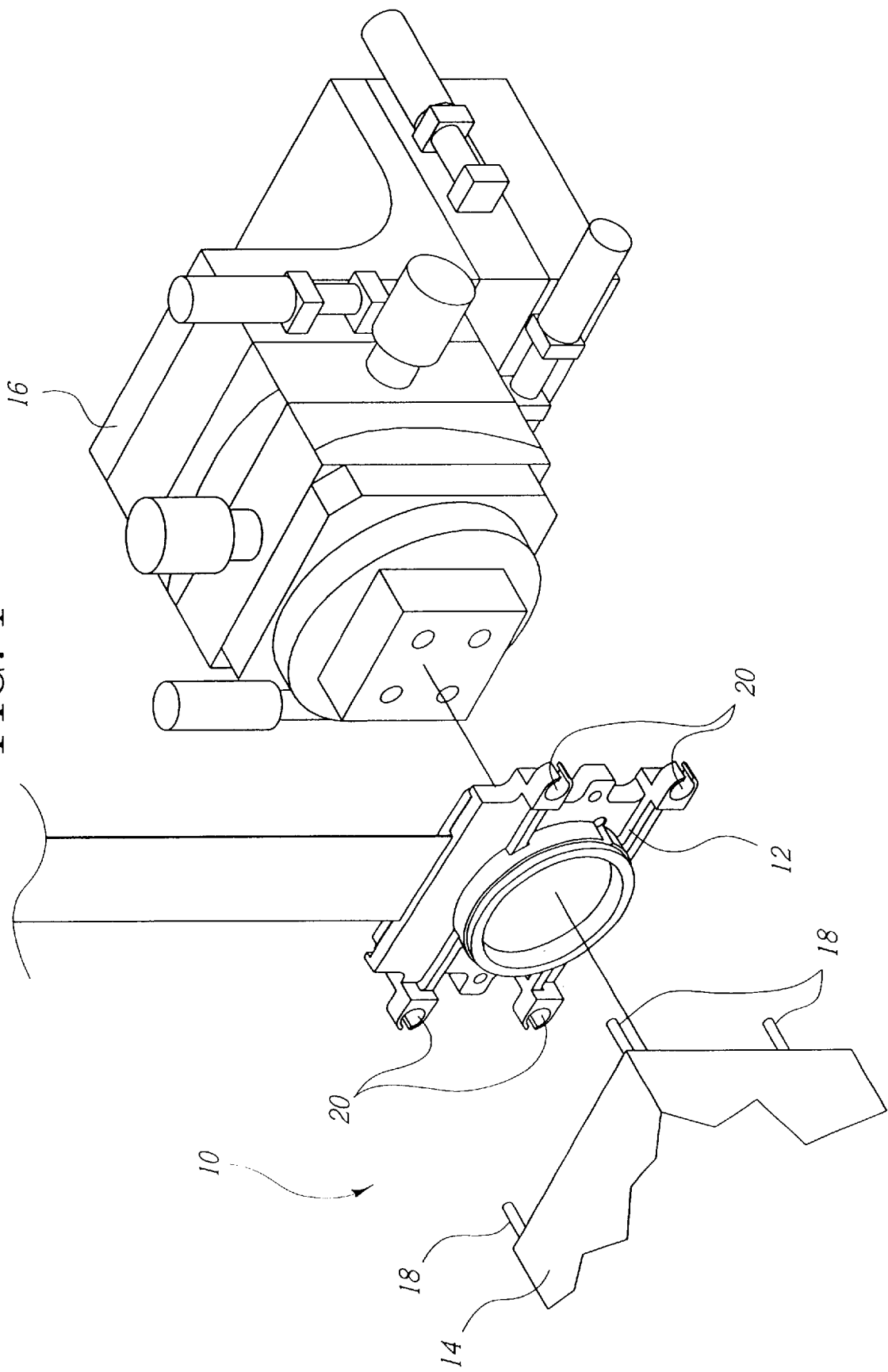
FIG. 1 is a perspective view of a mechanical convergence fixture apparatus according to the present invention.

The invention is presently embodied in a mechanical convergence fixture apparatus. The inventive mechanical convergence fixture apparatus is depicted in a diagrammatic view in FIG. 1 and is designated therein by the general reference character 10. The mechanical convergence fixture apparatus 10 has a liquid crystal display ("LCD") frame assembly 12 which is intended to be affixed to a chassis 14 using an alignment assembly 16, as will be described in more detail hereinafter.

The chassis 14 is that portion of the projection mechanism into which light is projected through the LCD frame assembly 12. As discussed previously herein in relation to the prior art, the chassis 14 for a color projector will have mounted thereto three of the LCD frame assemblies 12, one for each of the primary light colors. As can be seen in the view of FIG. 1, the chassis 14 has a plurality (four, in the present example) of locating studs 18, and the LCD frame assembly has a like plurality of locating holes 20 for sliding over the locating studs 18 so as to generally place the LCD frame assembly 122 in position on the chassis 14. It should be noted that the fit of the locating studs 18 within the locating holes is not tight, such that there can be some minor movement of the LCD frame assembly 12 in relation to the chassis 14 before the LCD frame assembly is finally affixed in place in the manner to be discussed hereinafter.

Figure 2:
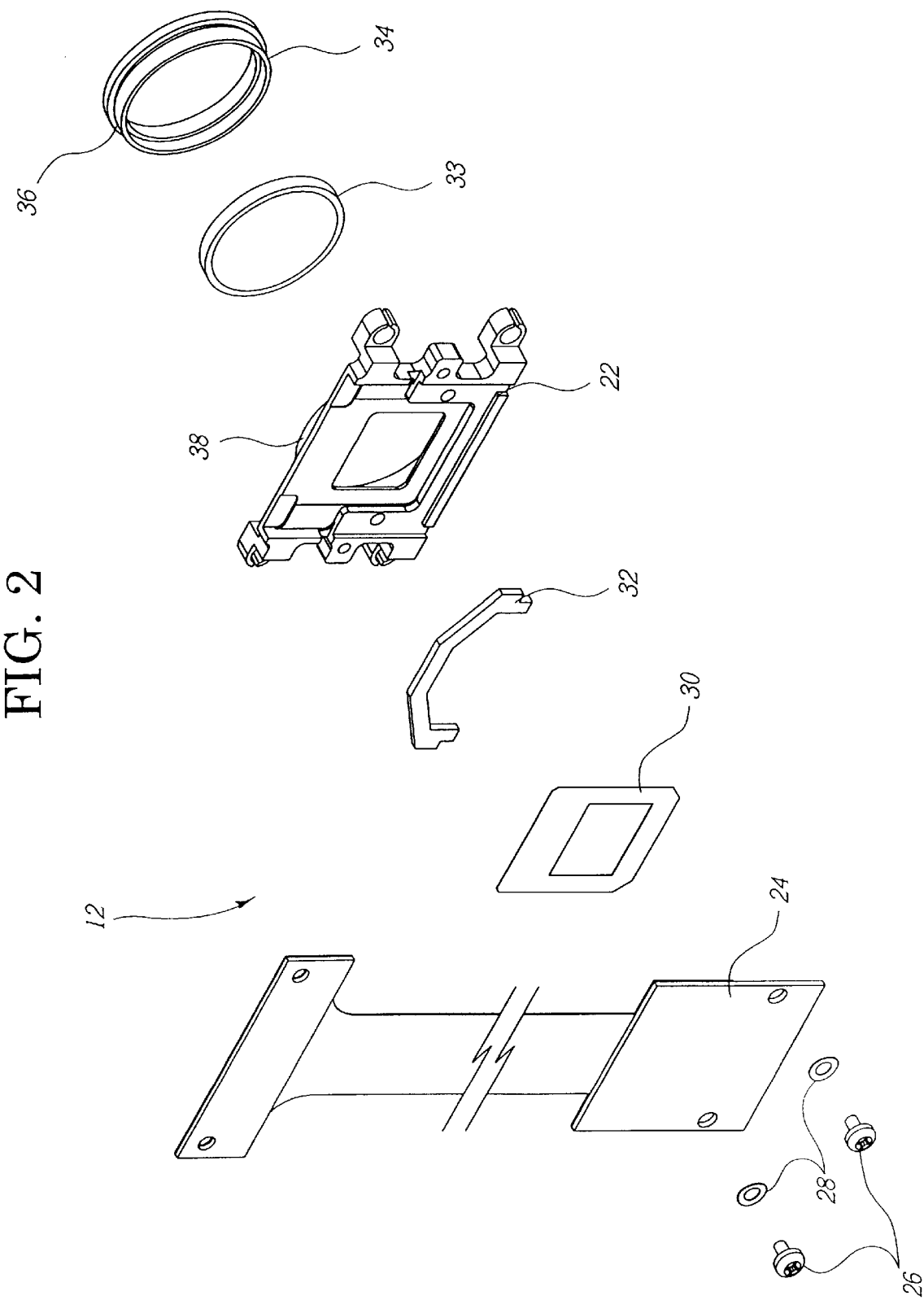
FIG. 2 is an exploded view of the LCD frame of FIG. 1.

FIG. 2 is an exploded perspective view of the LCD frame assembly 12. A frame 22 has a micro LCD 24 affixed thereto by a pair of pan head screws 26 using a pair of washers 28. The micro LCD 24 as used in the present invention is not different from that used in conjunction with prior art apparatus. An aperture stop (mask) 30 is provided between the micro LCD 24 and the frame 22 for limiting projected light to the generally rectangular shape intended. A gasket 32 is provided to seal the junction between the micro LCD 24 and the frame 22 so as to prevent dust and/or other contaminants from entering. The shape of the gasket 32 will be dependent upon the exact shape of the frame 22, such that a generally complete seal is created between the frame 22 and the micro LCD 24.

A field lens 33 is housed within a lens cell 34 which is mounted to the frame 22 in an adjustable manner so as to permit adjustment of the spacing between the field lens 33 and the micro LCD 24 which, in turn, permits adjustment of the magnification. In this embodiment, the lens cell 34 has a threaded collar 36 for mating to a lens attachment ring 38 on the frame 22 which is threaded in like manner on the inside.

Figure 3:
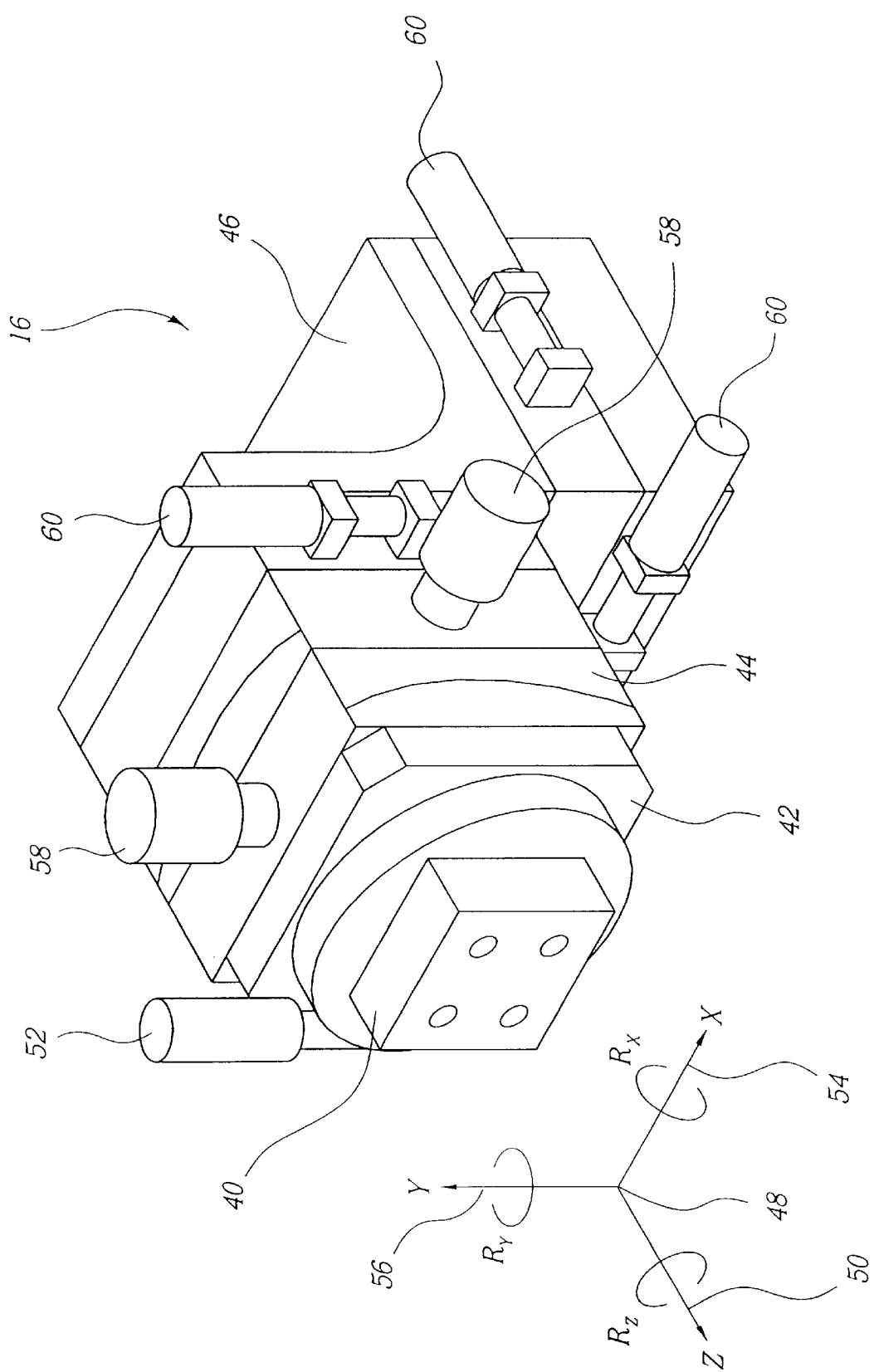
FIG. 3 is a perspective view of the alignment apparatus of FIG. 1.

FIG. 3 is a perspective view of the alignment assembly 16. A vacuum chuck 40 is provided for selectively holding the LCD frame assembly 12 in place on the alignment assembly 16. Apparatus for selectively providing vacuum to the vacuum chuck 40 is well known in the art and is not specifically depicted in the view of FIG. 3.

The alignment assembly 16 has a rotation stage 42, a two axis goniometer 44 and an X,Y,Z linear stage 46. The rotation stage 42, the goniometer 44 and the linear stage 46 are each commercially available parts which are well known to those skilled in the art and are available from several different manufacturers. The rotation stage 42, the goniometer 44 and the linear stage 46 each move the vacuum chuck 40 (with the LCD frame assembly 12 of FIG. 2 affixed thereto) in relation to a common origin 48. The rotation stage 42 rotates the LCD frame assembly 12 about a Z axis using a rotation adjustment screw 52. The goniometer 44 adjusts the LCD frame assembly 12 about the X axis 54 and a Y axis according to the position of two goniometer screws 58. The linear stage 46 adjusts the position of the LCD frame assembly 12 linearly along the X, Y and Z axis (50, 54 and 56) using the three linear stage screws 60 depicted in FIG. 3.

Various modifications may be made to the invention without altering its value or scope. For example, the alignment assembly 16 could be a custom made singular apparatus rather than the assemblage of "off the shelf" components as described herein. Another example of a likely modification would be to temporarily affix the LCD frame assembly 12 to the alignment assembly 16 by means other than the vacuum chuck 40 as described herein.

All of the above are only some of the examples of available embodiments of the present invention. Those skilled in the art will readily observe that numerous other modifications and alterations may be made without departing form the spirit and scope of the invention. Accordingly, the above disclosure is not intended as limiting and the appended claims are to be interpreted as encompassing the entire scope of the invention.

INDUSTRIAL APPLICABILITY

As previously discussed herein, it is critical that the micro LCD 24 be precisely located in relation to the chassis 14, because the focus and convergence of the images from the three micro LCD's 24 will otherwise not be correct. It is also critical that the magnification of each channel be essentially identical, otherwise absolute convergence of all pixels cannot be achieved. According to the present inventive method, the positioning of the LCD frame assembly 12 is accomplished by affixing the LCD frame assembly 12 temporarily to the alignment assembly 16 using the vacuum chuck 40, and then positioning the LCD frame assembly 12 in relation to the chassis 14 using the adjustment screws 52, 58 and 60 of the alignment assembly 16. The magnification of each image is then adjusted by repositioning the optical element (field lens 32) relative to the micro LCD 24 by turning the threaded lens attachment ring 38.

When the LCD frame assembly 12 is correctly positioned (as determined by visual inspection of the projected image by the operator, or by other criteria as may be established), the LCD frame assembly 12 is permanently affixed to the chassis 14 by placing a drop of adhesive 62 (FIG. 1) on each of the locating studs 18 and at least partially within each corresponding locating hole 20. An additional drop of the adhesive 62 is placed on the threaded collar 36 to hold the field lens 33 in place. In the embodiment described herein, the adhesive 62 is an epoxy, although many other types of adhesive or other bonding means might be used for the purpose. Thereafter, the LCD frame assembly 12 is detached from the alignment assembly 16 (by releasing vacuum from the vacuum chuck 40 in the embodiment . It should be noted that, according to the described embodiment of the present inventive method, three iterations of the inventive apparatus will be employed such that images of all three colors can be cooperatively adjusted.

According to the present invention, it will be easier to correctly position the LCD frame assembly 12 and such positioning will generally be more accurate, due in large part to the fact that the alignment assembly 16 can easily be more robust and precise than comparable components which must be made small enough and inexpensive enough to leave attached to the chassis 14 to be shipped with the final product. Yet another aspect of this is the fact that the marginal cost of alignment apparatus is reduced to essentially nothing, given that the alignment assembly 16 is not shipped with the final product, and may be reused time after time. The ability to separately adjust the field lens 33 position provides the ability to compensate for both magnification and focus errors between colors, thus enabling a converged and well focused image to be attained. A key to this is the provision of a compensation mechanism that allows for correlation of tolerance errors that typically arise in high resolution imaging systems due to manufacturing limitations—which limitations are avoided or at least optimally reduced as described herein.

According to the present invention, a compensation mechanism which allows for correction of typical tolerance errors in high resolution multi-channel imaging systems is provided. The magnification and focus can be adjusted independently on each channel to achieve well converged and focused images. There is an aperture stop 30 that is part of the assembly. The micro LCD 24 can be aligned to the aperture stop 30 with a high degree of accuracy. The field lens 33 can be independently positioned relative to the display device (the micro LCD 24) and the main housing (the chassis 14). This is accomplished with a minimum number of parts and yet a dust sealed airspace next to the display device is provided.

The invention allows convergence to sub-pixel accuracy over the entire image. The magnification and focus of the image in each channel can be adjusted slightly to accommodate manufacturing tolerances in the lenses and display devices. The assembly is constructed in such a way that the air space between the display device and the field lens (nearest optical element) is sealed to prevent the entrance of dust particulate. The display device can also be accurately aligned to the aperture stop which is placed directly against the device. This is all done without resorting to parts which are expensive to manufacture or assemble. The inventive method for aligning and converging images has shown itself to be invaluable for small high resolution display devices, particularly as the resolution of such-devices is increasing. To the inventor's knowledge, no comparable results have not been attained with any prior art devices.

The unique design of the LCD frame assembly 12 provides an elegantly simple solution to the problem of positioning and holding the micro LCD 24 in relation to the chassis 14, as used in accordance with the present inventive method. Since the mechanical convergence fixture apparatus 10 of the present invention may be readily produced and incorporated into the design and production of micro LCD projection systems, and since the advantages as described herein are provided, it is expected that the utility and industrial applicability of the invention will be both significant in scope and long-lasting in duration.

I claim:

1. A method for affixing a second micro LCD to a projection chassis having a first micro LCD positioned thereon, comprising:
   a. temporarily affixing the second micro LCD to an alignment assembly;
   b. aligning the second micro LCD in relation to the projection chassis to converge images generated by the second micro LCD and the first micro LCD;
   c. permanently affixing the second micro LCD to the projection chassis; and
   d. detaching the alignment assembly from said second micro LCD.

2. The method of claim 1, wherein:
   the LCD is rigidly affixed to an LCD frame assembly.

3. The method of claim 2, wherein:
   the LCD frame assembly includes a field lens.

4. The method of claim 1, wherein:
   step c. is accomplished by placing a drop of adhesive to affix the second LCD to the chassis.

5. A mechanical convergence fixture apparatus for positioning a second micro LCD in relation to a projector chassis having a first micro LCD positioned thereon, comprising:
   a frame for holding the second micro LCD; and
   an alignment assembly for temporarily holding and positioning the frame in relation to the projector chassis to converge images generated by the second micro LCD and the first micro LCD; wherein
   said alignment assembly is adapted to be removed from said frame after said frame is fixed in relation to the projector chassis.

6. The mechanical convergence fixture apparatus of claim 5, and further including:

a bonding substance for bonding said frame to the projector chassis prior to removing said alignment assembly from said frame.

7. The mechanical convergence fixture apparatus of claim 6, wherein:

said bonding substance is an adhesive.

8. The mechanical convergence fixture apparatus of claim 6, wherein:

said bonding substance is an epoxy.

9. The mechanical convergence fixture apparatus of claim 5, and further including:

an aperture stop rigidly affixed on said frame in relation to the second micro LCD.

10. The mechanical convergence fixture apparatus of claim 5, and further including:

a gasket for sealing between the second micro LCD and said frame.

\* \* \* \* \*

UNITED STATES PATENT AND TRADEMARK OFFICE
CERTIFICATE OF CORRECTION

PATENT NO. : 6,416,187 B1
DATED : July 9, 2002
INVENTOR(S) : Menard

It is certified that error appears in the above-identified patent and that said Letters Patent is hereby corrected as shown below:

<u>Title page,</u>
Item [75], Inventors address, replace "San Jose, CA" with -- Fremont, CA --.

Signed and Sealed this

Fifth Day of November, 2002

Attest:

Attesting Officer

JAMES E. ROGAN
Director of the United States Patent and Trademark Office